(12) United States Patent
Elford et al.

(10) Patent No.: US 10,886,712 B2
(45) Date of Patent: Jan. 5, 2021

(54) SYSTEM AND METHOD FOR NEW CABLE PROVISIONING USING APPLIED PHYSICAL PROCESS

(71) Applicant: CenturyLink Intellectual Property LLC, Denver, CO (US)

(72) Inventors: Michael L. Elford, Calhoun, LA (US); Pete A. Kawamoto, Littleton, CO (US); Diana L. Unser, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 553 days.

(21) Appl. No.: 15/684,033

(22) Filed: Aug. 23, 2017

(65) Prior Publication Data
US 2018/0115141 A1   Apr. 26, 2018

Related U.S. Application Data

(60) Provisional application No. 62/410,696, filed on Oct. 20, 2016.

(51) Int. Cl.
| | | |
|---|---|---|
| *H02G 1/08* | (2006.01) | |
| *E02F 5/00* | (2006.01) | |
| *E21B 7/18* | (2006.01) | |

(52) U.S. Cl.
CPC ............... *H02G 1/085* (2013.01); *E21B 7/18* (2013.01); *H02G 1/081* (2013.01); *E02F 5/003* (2013.01)

(58) Field of Classification Search
CPC .......... H02G 1/081; H02G 1/08; H02G 1/085; H02G 1/1275; H02G 1/1287; E21B 7/046; E21B 7/065; E21B 7/18; E21B 7/28

USPC .................................................. 254/134.3 R
See application file for complete search history.

(56) References Cited

U.S. PATENT DOCUMENTS

| | | | |
|---|---|---|---|
| 2,827,264 A | | 3/1958 | Sitton |
| 3,543,377 A | * | 12/1970 | Bremner ............... B08B 9/0436 29/234 |
| 4,403,667 A | | 9/1983 | Reichman |
| 4,519,462 A | | 5/1985 | Kelley |
| 5,096,000 A | | 3/1992 | Hesse |
| 5,639,183 A | | 6/1997 | Griffioen |
| 6,824,329 B2 | | 11/2004 | van Bijsterveld |
| 7,814,654 B2 | | 10/2010 | Pichler |
| 7,967,530 B2 | | 6/2011 | Mayhew |
| 9,651,167 B2 | | 5/2017 | Harr |
| 10,343,877 B2 | * | 7/2019 | Cilliers ..................... B66D 1/14 |
| 2003/0012606 A1 | | 1/2003 | van Bijsterveld |
| 2004/0067108 A1 | | 4/2004 | Bayer |

(Continued)

FOREIGN PATENT DOCUMENTS

DE   10-2011-087642 A1   6/2013

*Primary Examiner* — Lee D Wilson
*Assistant Examiner* — Seahee Hong

(57) ABSTRACT

Novel tools and techniques for new cable provisioning utilizing an applied physical process are provided. A system includes a physical process applicator and a first coupler. The first coupler may be configured to attach to a first end of a first cable. The physical process applicator may be configured to apply a physical process to the first cable, and tension the first cable, via the first coupler. The first coupler may further be configured to cause, via the physical process, the first cable to displace at least some ground material surrounding the first cable, and allow at least part of the first cable to be removed.

4 Claims, 5 Drawing Sheets

(56) References Cited

U.S. PATENT DOCUMENTS

| | | |
|---|---|---|
| 2007/0119283 A1 | 3/2007 | Wurm |
| 2016/0372902 A1* | 12/2016 | Nusbaum ............. H02G 1/1275 |
| 2017/0085065 A1 | 3/2017 | Fitzgerald |
| 2017/0179693 A1* | 6/2017 | Chen ...................... D07B 7/169 |
| 2018/0039040 A1 | 2/2018 | Elford et al. |
| 2018/0041017 A1 | 2/2018 | Elford et al. |
| 2018/0051540 A1* | 2/2018 | Castillo ................ E21B 47/007 |

* cited by examiner

SYSTEM AND METHOD FOR NEW CABLE PROVISIONING USING APPLIED PHYSICAL PROCESS

CROSS REFERENCE TO RELATED APPLICATIONS

This application claims priority to U.S. Provisional Patent Application Ser. No. 62/410,696 filed Oct. 20, 2016 by Michael Elford et al., entitled "DCAPP—Direct Cable Applied Physical Process."

This application may be related to U.S. Provisional Patent Application Ser. No. 62/371,646, filed Aug. 5, 2016 by Michael L. Elford et al., entitled, "DCEP—Direct Cable Expansion Project to Insert Fiber;" U.S. Provisional Patent Application Ser. No. 62/410,688, filed Oct. 20, 2016 by Michael L. Elford et al., entitled "DCEP—Direct Cable Expansion Project (Injection Process);" U.S. Provisional Patent Application Ser. No. 62/371,647, filed Aug. 5, 2016 by Michael L. Elford et al., entitled, "DCBP—Direct Cable Buried Project to Place Fiber;" and U.S. Provisional Patent Application Ser. No. 62/410,691 filed Oct. 20, 2016 by Michael Elford et al., entitled "DCBP—Direct Cable Buried Project (Boring Process)."

The respective disclosures of these applications/patents (which this document refers to collectively as the "Related Applications") are incorporated herein by reference in their entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunication cables and physical transmission mediums, and more particularly to tools and techniques for the installation of new telecommunication cables.

BACKGROUND

Copper wire cabling has historically been used as a transmission medium for telecommunications. Copper cables, such as twisted pair cabling, traditionally used in telecommunications offer limited data bandwidth, and are also limited by the distances over which signals need to be carried in modern telecommunications. As demand for bandwidth and transmission speed increases, the use of existing copper cables has been replaced by other transmission media, such as optical fiber.

Typically, telecommunication lines are buried. Thus, to install new cable or replace existing copper cable, cost and labor-intensive processes are used. This may involve excavation and trenching of roads, residential areas, and other areas where the cable will be buried.

Accordingly, tools and techniques for the installation of new cables are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
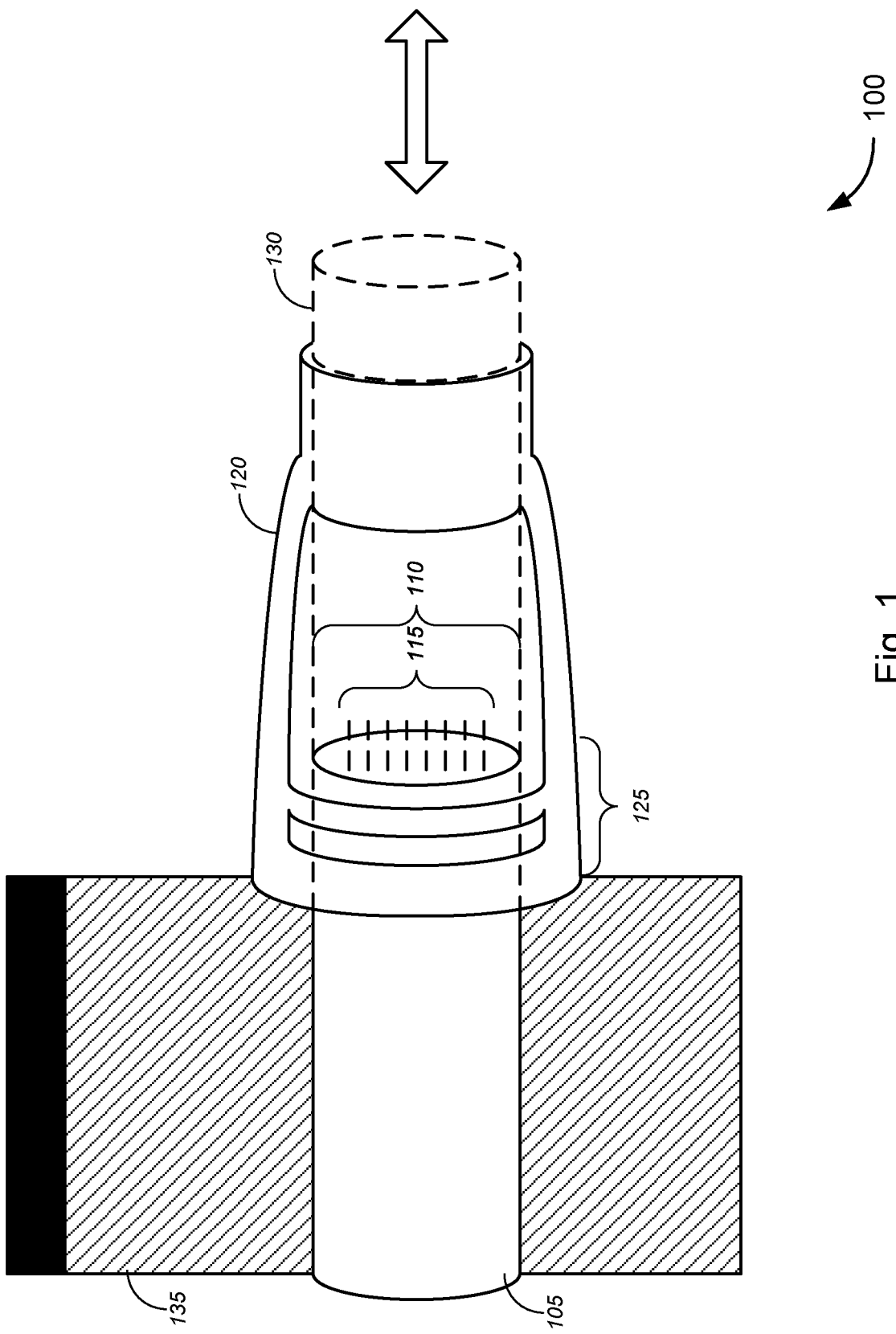
FIG. 1 is a schematic illustration of a system for new cable installation using an applied physical process, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system for replacing an existing buried cable and installing a new cable utilizing an applied physical process is provided. The system may include a physical process applicator and a first coupler. The first coupler may be configured to attach to a first end of a first cable. The physical process applicator may then be configured to apply a physical process, through the first coupler, to the first cable. The physical process applicator may further be configured to tension the first cable, via the first coupler. The first coupler may be configured to cause the first cable, through application of the physical process, to displace at least some ground material surrounding the first cable. The first coupler may further be configured to allow at least part of the first cable to be removed, once the ground material has been displaced.

In another aspect, an apparatus for replacing an existing buried cable and installing a new cable utilizing an applied physical process is provided. The apparatus may include a first coupler and a tensioner. The first coupler may be configured to attach to a first end of a first cable. The tensioner may be operatively coupled to the first coupler to tension the first cable via the first coupler. The first coupler may be further configured to allow at least part of the first cable to be removed.

In a further aspect, a method for replacing an existing buried cable and installing a new cable utilizing an applied physical process is provided. The method may begin by attaching a first coupler to a first end of a first cable. The first coupler may then be used to apply tension to the first cable. A physical process may be applied via the first coupler to the first cable. After the physical process has been applied, the first cable may be removed from a ground material via the first coupler.

FIG. 1 is a schematic illustration of a system 100 for new cable installation using an applied physical process. According to various embodiments, the system 100 includes an existing buried cable 105 with an outer sheath 110 and core 115, a physical process applicator 120, exposed portion 125 of cable 105, and new cable 130. FIG. 1 also depicts a work pit, ground material 135, and a top of ground where the cable 105 is buried. It should be noted that the components of the system 100 are schematically illustrated in FIG. 1, and that a variety of hardware configurations are possible in accordance with various embodiments.

In various embodiments, physical process applicator 120 may be coupled to the exposed portion 125 of the cable 105. The physical process applicator 120 may be configured to be coupled to either the outer sheath 110 of the cable 105, or the core 115 of the cable 105. The physical process applicator 120 may be configured to push or pull the cable 105 in at least one direction, along a longitudinal axis of the cable 105. The physical process applicator 120 may further be configured to be coupled to a driver. The driver may be configured to drive the physical process applicator 120 to apply a physical process to the cable 105. For example, physical processes may include heating, vibrating, tensioning, or otherwise physically altering the cable 105. Accordingly, the driver may include, without limitation, an electrical power source, generator, compressor, or pump, configured to drive the physical process of the physical process applicator 120. In some embodiments, the cable 105 may be buried in soil or other types of ground material 135. To gain access to the cable, a work pit may be created, allowing access to the exposed portion 125 of the cable 105, and allowing the physical process applicator 120 to be coupled to the cable 105.

In various embodiments, cable 105 may include an outer sheath 110 and core 115. The cable 105 may include any type of cable, buried or otherwise, such as those used for electrical transmission and telecommunications. Types of cable may include, without limitation, copper cables, telephone cables, twisted pair cables, and optical fiber cables, among others. In some further embodiments, the cable 105 may further include a housing configured to carry one or more sub-cables. For example, housings may include, without limitation, ducts (e.g., inner ducts), and cable conduits.

The outer sheath 110 of the cable 105 may act to hold together (e.g., house) one or more wires, conductors, optical fibers, or other transmission lines of the core 115. The outer sheath 110 may further serve as a protective cover to physically protect the cable from damage and wear due to movement, vibration, weather, moisture, and the ground material 135 surrounding the cable 105. Ground material 135 may include soil, silt, dust, sand, clay, gravel, rock, and water. Accordingly, the outer sheath 110 may include, without limitation, tubes, sleeves, shielding, and jackets surrounding the one or more wires, conductors, optical fibers, or other transmission lines of the core 115.

The core 115 may include one or more types of transmission media located inside or otherwise housed by the outer sheath 110. In some embodiments, the core 115 may be a single conductor, wire, optical fiber, or other transmission line. For example, the core 115 may be a single copper conductor core. In other embodiments, the core 115 may include multiple conductors, wires, optical fibers, cables, and/or other transmission lines of the same type, such as, for example multiple copper wire twisted pair cables. Alternatively, the core 115 may include multiple transmission lines of different types. For example, the core 115 may include one or more copper wire twisted pair cables, and one or more copper wires for power delivery. Accordingly, the core 115 may include one or more transmission lines of one or more transmission media types. In various embodiments, the cable 105 and/or core 115 may further include, in addition to the transmission lines, any associated insulation, shielding, cladding, buffering, or other inner material located adjacent to the interior of the outer sheath 110.

Accordingly, the outer sheath 110 may be configured to provide protection to the core 115 against physical stresses and the environment around the cable 105. Suitable materials for the outer sheath 110 may include, without limitation, rubber, thermoplastics such as polyvinyl chloride (PVC), polyurethane (PU), acrylonitrile butadiene styrene (ABS), polycarbonate (PC), polyethylene (PE), polypropylene (PP), and other materials.

In various embodiments, the physical process applicator 120 may be configured to couple to the exposed portion 125 of the cable 105, allow the physical process applicator 120 to apply the physical process to the cable 105. The physical process applicator 120 may, for example, be physically coupled to the cable 105 such that physical processes, such as, without limitation, electricity, heat, vibration, rotation, or tension may be applied to the cable 105. The physical process applicator 120 may be coupled to the outer sheath 110 or the core 115 of the cable 105. Accordingly, the physical process applicator 120 may include various types of couplers and/or connectors. In various embodiments, physical process applicator 120 may include, without limitation, clamps (e.g., cable clamps, hose clamps, etc.), fittings (e.g., barb fittings, etc.), fasteners (e.g., cable fasteners, wire ties, etc.), hooks, clips, and other devices.

Although the physical process applicator 120 is depicted as coupling to one end of the cable 105, at the exposed portion 125, it should be understood that in other embodiments, the physical process applicator 120 may be configured to couple to other parts of the cable 105. For example, in some embodiments, the exposed portion 125 of the cable 105 may be an intermediate point between two ends of the cable 105. Thus, the physical process applicator 120 may couple to any part of the cable 105 through which the physical process applicator 120 may apply a physical process.

Once secured to the cable 105 in any orientation, the physical process applicator 120 may begin applying the desired physical process to the cable 105. For example, the physical process applicator 120 may be a clamp that attaches to the exposed portion 125 of the cable 105. The physical process applicator 120 may then introduce vibration, rotation, tension, heat, electricity, or other physical process to the cable 105, from the exposed portion 125. In some embodiments, more than one physical process applicator 120 may be used. For example, a physical process applicator 120 may be provided at either end of a cable 105. In further embodiments, the physical process applicator 120 may further include an electrical power source, generator, compressor, or pump, or other device configured to drive the physical process applicator 120 to apply the physical process.

In some embodiments, the physical process may cause the ground material 135 around the outer sheath 110 to be displaced. Displacement of the ground material 135 may include, without limitation, loosening, removing, or otherwise moving the ground material 135. For example, in some embodiments, the ground material 135 may be compacted (e.g., compacted soil). Thus, the physical process applicator 120 may be configured to loosen the compacted ground material 135 by applying vibration, or other physical process, to the cable 105. Once loosened from the ground material 135, the cable 105 may be removed from the ground material 135, by the physical process applicator 120. For example, the physical process applicator 120 may tension, pull, rotate, or otherwise move the cable 105 to allow its removal from the ground material 135. In some embodiments, this may leave a channel in the ground material 135, in place of the cable 105, where new cable 130 may be installed.

In yet further embodiments, the physical process applicator 120 may be configured to heat the core of the cable 105. For example, in the physical process applicator 120 may include one or more couplers configured to attach directly to a core 115 of the cable 105. The physical process applicator 120 may further include a power supply configured to provide electrical power. The physical process applicator 120 may, thus, be configured to heat the core 115 of the cable 105 by applying electrical power to the core 115, via the power supply. In some embodiments, the physical process of heating the core 115 may cause at least part of a surrounding material to soften, melt, liquefy, or burn away. The surrounding material may include, without limitation, cladding, insulation, or buffering. Heating of the core 115 may allow at least one of the surrounding material, core 115, or both to be removed from the outer sheath 110 of the cable 105. In some further embodiments, the temperature of the core 115 may be monitored to prevent the outer sheath 110 from becoming damaged by the heat, while still allowing the surrounding material of the core 115 to be softened, melted, liquefied, or burned. Once the surrounding material of the core 115 has been removed via the heat, the conductors of core 115 may be removed, leaving the outer sheath 110 intact in its original position. The outer sheath 110 may thereafter be used as a conduit for the installation of one or more new cables 130.

In some further embodiments, the physical process applicator 120 may be configured to be coupled to a new cable 130, and install the new cable 130. For example, in some embodiments, the physical process applicator 120 may be configured to push and/or pull the new cable 130 into a desired position, installing the new cable 130 concurrently with the removal of the cable 105. The physical process applicator 120 may be configured to be coupled to one of the outer sheath 110 or core 115 of the cable 105 on one side, and couple to the new cable 130 on the other side. Thus, as the cable 105 is removed, the physical process applicator 120 may further be configured to position the new cable 130 in the same position that cable 105 was located prior to removal. It is to be understood that in other embodiments, different arrangements may be utilized to couple to both the cable 105 and new cable 130, and that new cable 130 may be installed in a different position from where the cable 105 is located prior to its removal. In yet further embodiments, the new cable 130 may instead be an inner duct. The new cable 130 may be configured to replace, or in other examples, to encase the cable 105.

In some embodiments, the physical process applicator 120 may include a coupler to allow one or more new cables 130 both to attach to, and detach from, the physical process applicator 120 (e.g., removably attached). For example, after the new cable 130 has been placed in the desired positioned, the physical process applicator 120 may be configured to detach from one or more new cables 130.

In some embodiments, the physical process applicator 120 may further be configured to create a channel around at least part of the cable 105. For example, physical process applicator 120 may cause the cable 105 itself to push the ground material 135 away from the outer sheath 110. The channel may include a volume that coextends with the outer sheath 110. The channel may be formed to create spacing between the outer sheath 110 and the ground material 135. In some embodiments, the channel may be formed such that separation between the outer sheath 110 and ground material 135 occurs over at least part of the outer sheath 110 circumferentially. In further embodiments, the channel may be formed over the entire circumference of the outer sheath 110, surrounding the outer sheath 110 on all sides.

Accordingly, in various embodiments, the ground material 135 may be displaced utilizing the cable 105 itself, such as by vibrating the cable 105 via the physical process applicator 120. The physical process applicator 120 may be driven by an electrical power source, generator, compressor, or pump, to cause pneumatic, hydraulic, or electrical actuation. For example, the physical process applicator 120 may be actuated pneumatically or hydraulically to apply vibration, rotation, tension, or other physical process to the cable 105. When the physical process is applied to the cable 105, the cable 105 may itself cause the ground material 135 to be displaced from around the cable 105.

In some embodiments, the physical process applicator 120 may further be configured to push or pull the cable 105 in one or more directions along a longitudinal axis of the cable 105. For example, in some embodiments, the physical process applicator 120 may be configured to tension the cable 105, from one or more positions on the cable. This may include pulling the cable 105 from one end, pulling the cable 105 from both ends in opposite directions, pushing the cable 105 from one end, or pushing and pulling the cable 105 from multiple locations. In some embodiments, the physical process applicator 120 may further be coupled to a chain, rope, or other retractable line that may be retracted via a tensioner, such as, without limitation, a spool, winch, pulley, or other tensioning device to tension the cable 105.

In some embodiments, the physical process applicator 120 may advance the cable 105 in one direction simultaneously with the action of displacing the ground material 135.

For example, vibration, rotation, tensioning, or other physical process may be applied to the cable 105 simultaneously with pulling or pushing of the cable 105. Similarly, as previously described, the physical process applicator 120 may be configured to install new cable 130 simultaneously with the pushing/pulling of the buried cable 105.

In various embodiments, the coupler of the physical process applicator 120 may be clamp, clip, fitting, or fastener. In other embodiments, the coupler of the physical applicator 120 may be a sleeve-like structure that may be secured over the outer sheath 110 of the cable 105. In other embodiments, the coupler of the physical process applicator 120 may include other structural configurations. For example, the coupler of the physical process applicator 120 may include, without limitation, a full or partial sleeve that is fit around the outer sheath 110 or core 115, a collar, which may be opened and closed, that is secured around the outer sheath 110 or core 115, a clamp like an alligator clip, hose clip, cable clip, or an electrical probe-like device in electrical contact with the core 115, among other configurations.

In various embodiments, once the new cable 130 may include, without limitation, one or more new transmission lines, cables, or conduits (e.g., inner duct). Thus, in some embodiments, the physical process applicator 120 may be configured to couple to the new cable 130, and move the new cable into position through the displaced ground material 135. In some embodiments, this may occur concurrently with the displacement of the ground material 135 and removal of the cable 105 by the physical process applicator 120, while in other embodiments, the new cable 130 may be placed by the physical process applicator 120 after the cable 105 has been removed.

In various embodiments, the physical process applicator 120 may include an electrical power source, generator, compressor, or pump, configured to drive the physical process of the physical process applicator 120. Thus, the physical process applicator 120 may be pneumatically, hydraulically, or electrically driven. Thus, in various embodiments, the physical process applicator 120 may include, without limitation, air or gas compressors, fluid pumps, or a combination of compressors and pumps, which may in turn be configured to compress and/or pump air, nitrogen, carbon dioxide, argon, steam, water (in liquid form), or a combination different types of fluids. In some embodiments, instead of a pump or compressor, the physical process may instead be driven via an electrical power supply.

Figure 2A:
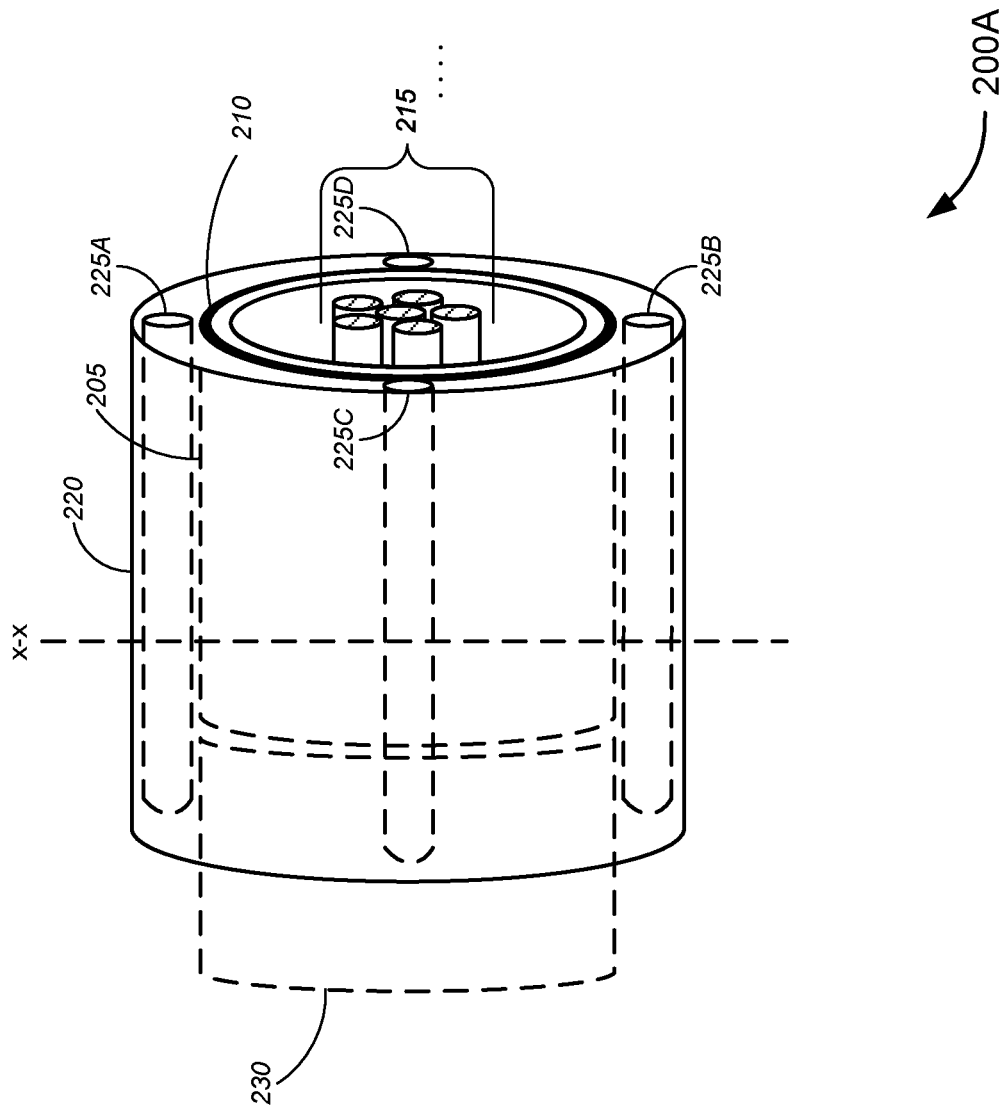
FIG. 2A is a schematic illustration of a system for new cable installation using an alternative applied physical process, in accordance with various embodiments.

FIG. 2A illustrates an alternative configuration of a system 200A for new cable installation using an applied physical process. According to various embodiments, the system 200A includes an existing buried cable 205 with an outer sheath 210 and core 215, a physical process applicator 220, vibrating elements 225A, 225B, 225C, 225D (collectively 225), and new cable 230.

In various embodiments, physical process applicator 220 may be coupled to the cable 205. In some embodiments, as depicted, the physical process applicator 220 may be configured to couple to one end of the cable 205. In some embodiments, the physical process applicator 220 may be configured to be coupled to either the outer sheath 210 of the cable 205. In other embodiments, the physical process applicator 220 may be configured to be coupled to the core 215 of the cable 205. The physical process applicator 220 may be configured to push or pull the cable 205 in at least one direction along a longitudinal axis of the cable 205.

In various embodiments, the physical process applicator 220 may further include a mechanism through which a physical process may be applied to the cable 205. In the embodiments depicted, a plurality of vibrating elements 225 are provided to apply a physical process, in this case vibration, to the cable 205. The plurality of vibrating elements 225 may include any device capable of introducing vibration to the cable 205. For example, vibrating elements 225 may include, without limitation, vibration motors or vibrating pistons. Although the plurality of vibrating elements 225 are depicted as substantially elongated members arranged to extend with the longitudinal axis of the cable 205, it is to be understood that the plurality of vibrating elements 225 may take any other suitable shape, form, or arrangement. For example, in some embodiments, the vibrating elements 225 may instead form a plurality rings, sleeves, strips, or an array of elements. The physical process applicator 120 may be configured to cause the cable 205 to vibrate, via the plurality of vibrating elements 225, over its entire length or a portion of the cable 205. In some embodiments, more than one physical process applicator 220 may be coupled to the cable 205 to introduce vibration or other physical process to the cable 205. In some embodiments, one or more of the plurality of vibrating elements 225 may be in direct physical contact with the cable 205. In some embodiments, at least part of each individual vibrating element 225A-225D of the plurality of vibrating elements 225 may be in contact with the with the cable 205. In other embodiments, one or more of the plurality of vibrating elements 225 may be in contact with the cable 205 indirectly, via the physical process applicator 220.

In some embodiments, the physical process applicator 220 may be configured to rotate, tension, heat, or apply another physical process to the cable 205, instead of, or in addition to other physical processes. In embodiments where the physical applicator 220 rotates the cable 205, the physical process applicator 120 may include a plurality of rollers, tracks, or ball bearings. In embodiments where the physical process applicator 220 is configured to tension the cable 205, the physical process applicator 220 may be configured to pull the cable 205, or core 215 of the cable 205, in a desired direction to increase or decrease tension. In such embodiments, the physical process applicator 220 may further be coupled to a chain, rope, or other retractable line that may be retracted via a tensioner, such as, without limitation, a spool, winch, pulley, or other tensioning device to tension the cable 205.

In the depicted embodiments, the physical process applicator 220 is configured to further couple to the new cable 230. As previously described, the physical process applicator 220 may be configured to be coupled to a new cable 230, and install the new cable 230. For example, in some embodiments, the physical process applicator 220 may be configured to push and/or pull the new cable 230 into a desired position, installing the new cable 230 concurrently with the removal of the cable 205. The physical process applicator 220 may be configured to be coupled to one of the outer sheath 210 or core 215 of the cable 205 on one side, and couple to the new cable 230 on the other side. Thus, while the cable 205 is removed, the physical process applicator 220 may further be configured to position the new cable 230 in a desired location and/or orientation.

As with the cable 205, in some embodiments, one or more of the plurality of vibrating elements 225 may be in direct physical contact with the new cable 230. In some embodiments, at least part of each individual vibrating element 225A-225D of the plurality of vibrating elements 225 may be in contact with the with the cable 205. In other embodiments, one or more of the plurality of vibrating elements 225 may be in contact with the cable 205 indirectly, via the physical process applicator 220.

As previously described with respect to FIG. 1, in some embodiments, the physical process applicator 220 may include a coupler to allow one or more new cables 230, and existing buried cable 205, to attach to and detach from the physical process applicator 220. For example, after the new cable 230 has been placed in the desired positioned, the physical process applicator 220 may be configured to detach from one or more new cables 230, and from the existing buried cable 205.

Figure 2B:
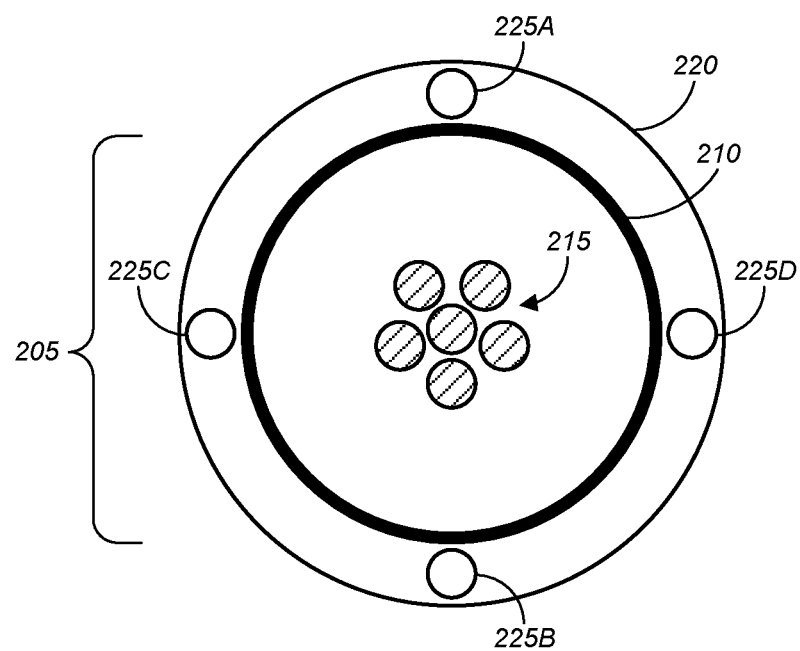
FIG. 2B is a transverse cross-sectional view of a buried cable and physical process applicator, in accordance with various embodiments.

FIG. 2B is a transverse cross-sectional view 200B of a buried cable 205 and physical process applicator 220 of the system 200A, taken at line x-x. The transverse cross-sectional view 200B illustrates the physical process applicator 220, cable 205, outer sheath 210, core 215, and vibrating elements 225A-225D (collectively 225). In the transverse cross-sectional view 200B, the physical process applicator 220 fully surrounds the outer sheath 210 of the cable 205, forming a sleeve around the cable 205. The physical process applicator 220 may displace ground material from around the cable 205, allowing the cable 205 to be removed, and one or more new cables to be installed.

In some embodiments, the plurality of vibrating elements 225 may be contained within the body the physical process applicator 220. Thus, the body of the physical process applicator 220 may transfer vibrations from the plurality of vibrating elements 225 to the cable 205. In other embodiments, the plurality of vibrating elements 225 may be positioned such that they are in direct contact with the cable 205, or alternatively, the plurality of vibrating elements 225 may be coupled to the outside of the body of the physical process applicator 220.

In further embodiments, the physical process applicator 220 may include a mechanical vibrator, such as, without limitation, an electric motor and unbalanced mass, or a piston vibrator. Thus, in some embodiments, the body of the physical process applicator 220 may itself be a vibrating element.

Figure 3:
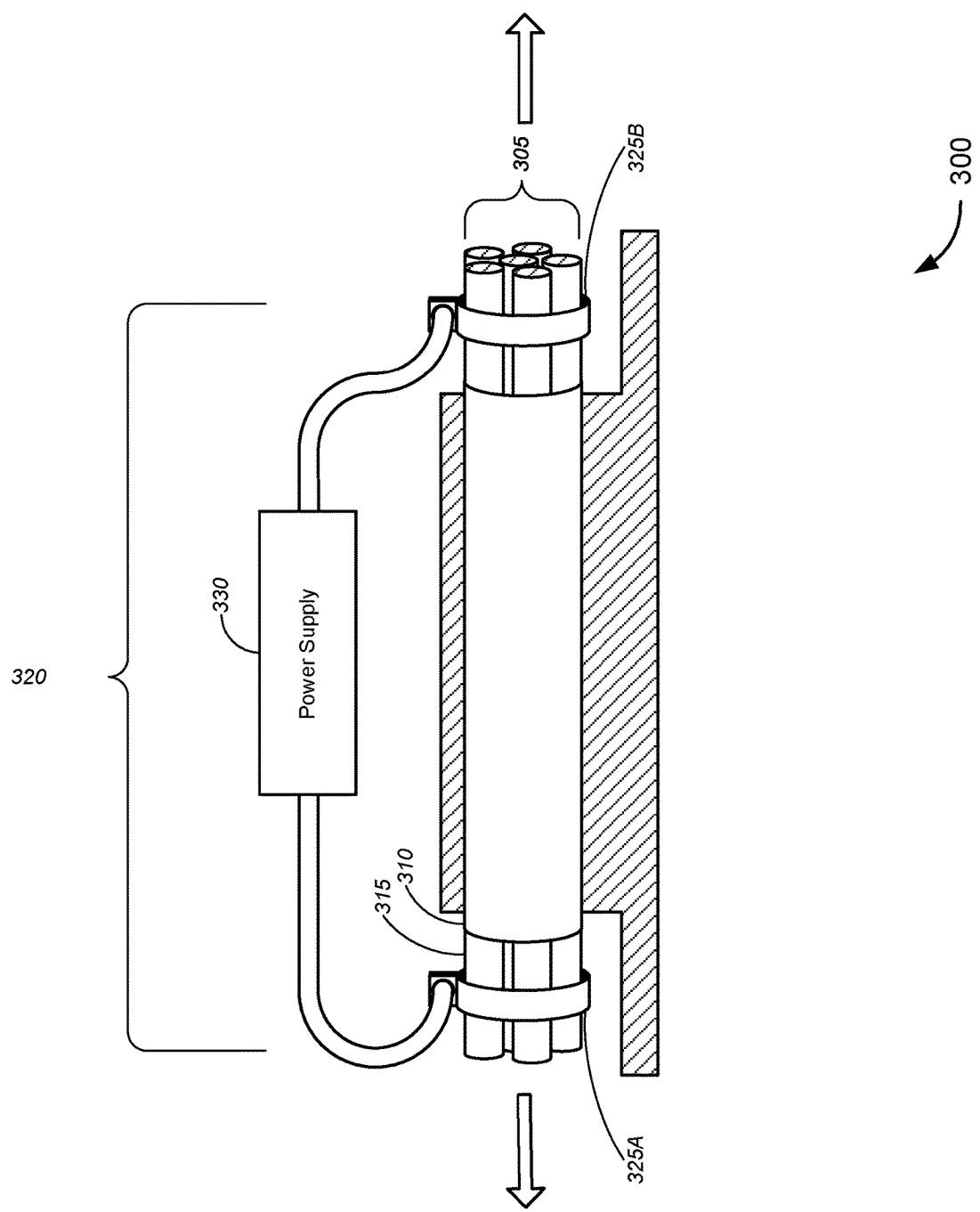
FIG. 3 is a schematic illustration of a system for new cable installation using an alternative applied physical process, in accordance with various embodiments.

FIG. 3 is a schematic illustration of an alternative configuration of a system 300 for new cable installation using an applied physical process. According to various embodiments, the system 300 includes an existing buried cable 305 with an outer sheath 310 and core 315,0 a physical process applicator 320 including a first coupler 325A and a second coupler 325B (collectively 325), and a power supply 330.

In various embodiments, physical process applicator 320 may be coupled to an exposed portion of the core 315 of the cable 305. The physical process applicator 320 may include two couplers 325, a first coupler 325A and a second coupler 325B, each of which are respectively in electrical contact with a respective end of the core 315 (e.g., a first end and a second end), and a power supply 330. Accordingly, in various embodiments, the core 315 of the cable 305 may be an electrical conductor.

The power supply 330 may be configured to provide electrical power, via a positive supply terminal associated with a first voltage level, and a negative terminal associated with a second voltage level. In various embodiments, each coupler 325 of the physical process applicator 320 may be electrically coupled to the power supply 330. For example, a first coupler 325A of the physical process applicator 320 may be coupled to one of the positive or negative terminal of the power supply 330. The second coupler 325B, correspondingly, may be coupled to the other of the negative or positive terminal of the power supply 330 to which the first coupler 325A is not coupled. Thus, for example, if the first coupler 325A is coupled to the positive supply terminal, the second coupler 325B may be coupled to a negative supply terminal.

In various embodiments, the power supply 330 may include either a direct current or alternating current power supply. The power supply 330 is configured to drive current (e.g., electrical power) through the core 315 of the cable 305, causing the core 315 to become heated. The core 315 may include, without limitation, conductors such as copper wire, twisted pair, solid core conductors, and stranded conductors. The physical process applicator 320 may, thus, be configured to heat the core 315 of the cable 305 by applying electrical power to the core 315, via the power supply.

In some embodiments, the physical process of heating the core 315 may cause at least part of a material surrounding the core 315 to soften, melt, liquefy, or burn. Surrounding material of the core 315 may include, without limitation, cladding, insulation, or buffering. As previously described with respect to FIG. 1, heating of the core 315 may allow at least one of the surrounding material, core 315, or both to be removed from the outer sheath 310 of the cable 305. Furthermore, in some embodiments, the temperature of the core 315 may be monitored to prevent the outer sheath 310 from becoming damaged by the heat generated by the core 315, while still allowing the surrounding material of the core 315 to be softened, melted, liquefied, or burned. Once the surrounding material of the core 315 has been removed via the heat, the conductors of core 315 may be removed, leaving the outer sheath 310 intact in its original position.

In various embodiments, physical process applicator 320, via at least one of the coupler 325, may further be configured to push or pull the core 315 of the cable 305, in at least one direction along a longitudinal axis of the cable 305. In further embodiments, the physical process applicator 320 may be configured to rotate, tension, vibrate, or apply another physical process to the cable 305, instead of, or in addition to heating the core 315 via application of electrical power (e.g., current).

In yet further embodiments, as previously described, the physical process applicator 320 may be configured to be coupled to and install one or more new cables. For example, in some embodiments, at least one of the coupler 325 may be configured to further be coupled to a new cable. The at least one of the couplers 325 may be configured to be removably attached to both the core 315, and one or more new cables. In other embodiments, the physical process applicator 320 may include a different set of couplers for installing the new cable. In an alternative set of embodiments, the core 315 may be removed or detached from the couplers 325, and a new cable may subsequently be coupled to at least one of the couplers 325 and installed.

Figure 4:
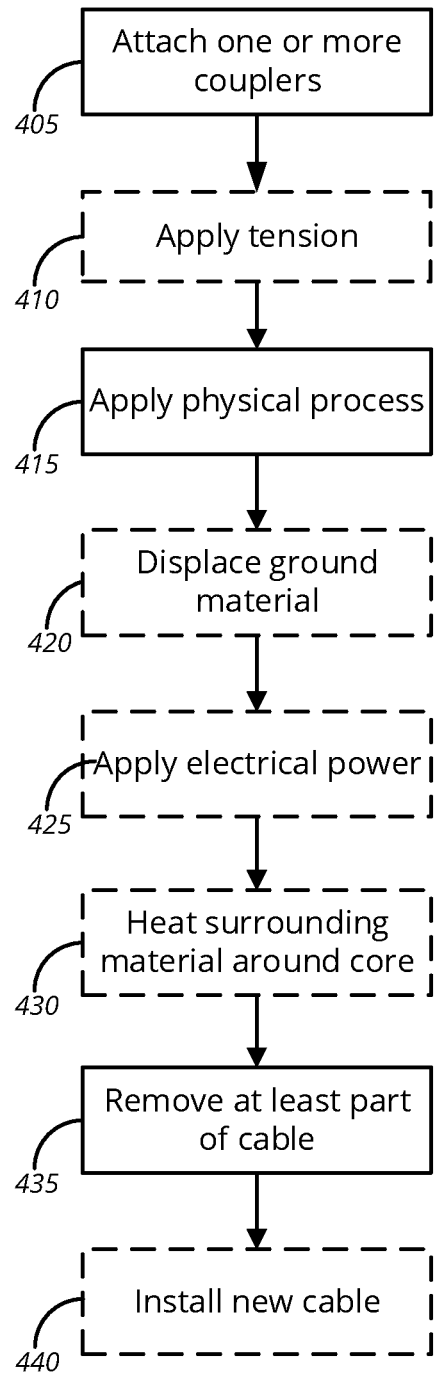
FIG. 4 is a flow diagram of a method for new cable installation using an applied physical process, in accordance with various embodiments.

FIG. 4 is a flow diagram of a method 400 for new cable installation using an applied physical process. In various embodiments, the method 400 begins, at block 405, with the attachment of one or more couplers of a physical process applicator to an existing buried cable. As previously discussed, the physical process applicator may include one or more couplers configured to couple to one or more of an outer sheath of a cable, a core of a cable, or a new cable. In some embodiments, a coupler may be configured to couple to an end of the cable, or to an intermediate point between the two ends of a cable.

At optional block 410, tension may be applied to the cable via the physical process applicator. In some embodiments, the physical process applicator may be configured to tension the existing buried cable, from one or more positions on the cable. This may include pulling the cable from one end, pulling the cable from both ends in opposite direction, pushing the cable, or pushing and pulling the cable from multiple locations. In some embodiments, the cable may be anchored or otherwise secured on one end to remain stationary, and pulled and/or pushed via the physical process applicator from a different end. In some embodiments, the physical process applicator may further be coupled to a chain, rope, or other retractable line that may be retracted via a tensioner, such as, without limitation, a spool, winch, pulley, or other suitable tensioning device to cause the cable to be tensioned.

At block 415, the physical process applicator may apply a physical process to the cable. In various embodiments, physical processes may include, without limitation, electricity, heat, vibration, rotation, or tension. Accordingly, the physical process applicator may be physically coupled to the cable such that physical processes may be applied to the cable. In some embodiments, the physical process applicator may include devices such as, without limitation, vibration elements, power supplies, drivers, actuators, pumps, and compressors, as previously described with respect to the above embodiments. The physical process applicators may include various types of couplers and/or connectors. In various embodiments, physical process applicator may include, without limitation, clamps (e.g., cable clamps, hose clamps, etc.), fittings (e.g., barb fittings, etc.), fasteners (e.g., cable fasteners, wire ties, etc.), hooks, clips, and other devices.

At optional block 420, ground material may be displaced from around the existing buried cable. In various embodiments, the cable may be a buried cable, surrounded by a ground material. The ground material may include soil, silt, dust, sand, clay, gravel, rock, and water. Thus, the physical process applicator may be configured to cause the cable to displace the ground material, through the application of the physical process.

At optional block 425, electrical power may be applied to a core of the cable. In some embodiments, the physical process may include the application of electrical power to the cable. For example, the physical process applicator may be coupled to a conductive core of the cable. The physical process applicator may include a power supply, to which two conductors are coupled. Each conductor may be coupled to the cable at two different ends of the cable. Accordingly, electrical power (e.g., current) may be supplied by the power supply to the core, causing the core to be heated.

At optional block 430, a surrounding material of the core may, in turn, be heated by the heating of the core itself. In some embodiments, surrounding material of the core may include, without limitation, cladding, insulation, or buffering around a conductor of the core. In some embodiments, by heating the core to a high temperature, the surrounding material may be softened, melted, liquefied, or burned. In some further embodiments, the temperature of the core and/or surrounding material may be controlled such that damage does not occur to an outer sheath of the cable.

At block 435, at least part of the cable may subsequently be removed. In some embodiments, the entire cable may be removed from a ground material, including the outer sheath and core. In some embodiments, after a surrounding material has been heated, the core of the cable may be removed from the outer sheath of the cable. Thus, in various embodiments, the physical process applicator may be configured to remove at least part of the cable. The physical process applicator may, for example, remove the cable via one or more couplers. The one or more couplers may be configured to pull and/or push at least part of the cable to cause its removal from the ground material.

At optional block 440, the physical process applicator may install a new cable. In various embodiments, installation of the new cable may include positioning of the new cable in a desired position. In some embodiments, the physical process applicator may be configured to install the new cable simultaneously with the removal of the existing buried cable. In other embodiments, the physical process applicator may be configured to install the new cable after at least part of the existing buried cable has been removed. As previously described, in some embodiments, the physical process applicator may be configured to removably attach to one or more new cables via one or more couplers. In some embodiments, the one or more couplers may further be configured to couple to both the existing buried cable and the one or more new cables.

While certain features and aspects have been described with respect to exemplary embodiments, one skilled in the art will recognize that numerous modifications are possible. For example, the methods and processes described herein may be implemented using different combinations of hardware components. Further, while various methods and processes described herein may be described with respect to structural and/or functional components for ease of description, methods provided by various embodiments are not limited to any specific structural and/or functional architecture, but instead can be implemented utilizing any suitable configuration or arrangement of parts. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a physical process applicator;
   a first coupler, included in the physical process applicator, configured to attach to a first end of a first cable; and
   a second coupler, included in the physical process applicator, configured to be coupled to an inner duct;
   wherein the physical process applicator is coupled to a driver configured to:
      apply a physical process, via the first coupler, to the first cable; and tension, via the first coupler, the first cable;
wherein the first coupler is configured to cause, via the physical process, the first cable to displace at least some ground material surrounding the first cable, and wherein the first coupler is further configured to allow at least part of the first cable to be removed;
wherein the second coupler is configured to pull the inner duct over the first cable so as to cover the first cable with the inner duct, and wherein the physical process applicator is configured to pull the second coupler in at least one direction along a longitudinal axis of the first cable; and
wherein the physical process applicator includes a power source configured to:
apply, via the first and second couplers, electrical power to a core of the first cable; and
cause at least part of a material surrounding the core to be heated.

2. The system of claim 1, wherein the first coupler is further configured to pull the first cable in at least one direction.

3. The system of claim 1, wherein the physical process applicator includes a component configured to vibrate, via the first coupler, the first cable.

4. The system of claim 1, wherein the first coupler is further configured to remove the core from an outer sheath of the first cable, wherein the first coupler is coupled to the core of the first cable, wherein the first coupler is further configured to pull the copper core of the first cable in the at least one direction.

* * * * *